Aug. 25, 1964 C. F. KINSER ETAL 3,146,334
PERCUSSIVE WELDING APPARATUS
Filed July 6, 1962 4 Sheets-Sheet 1
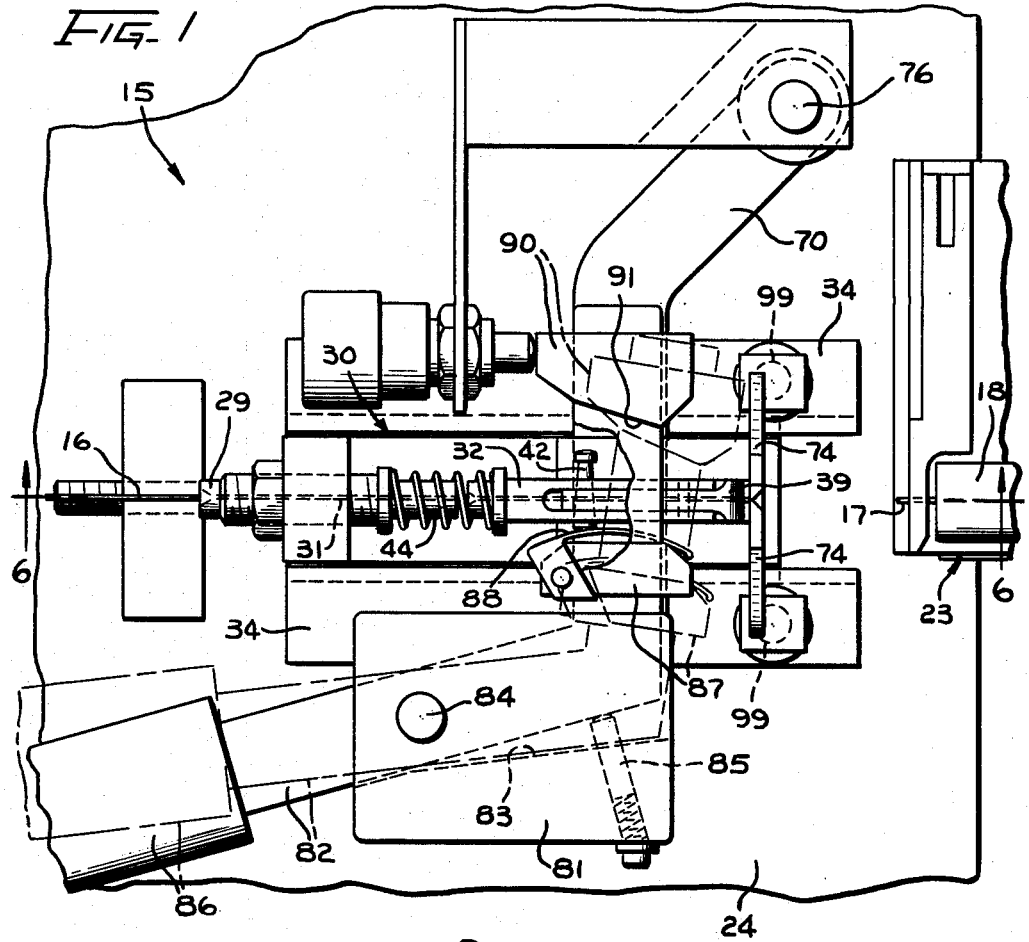
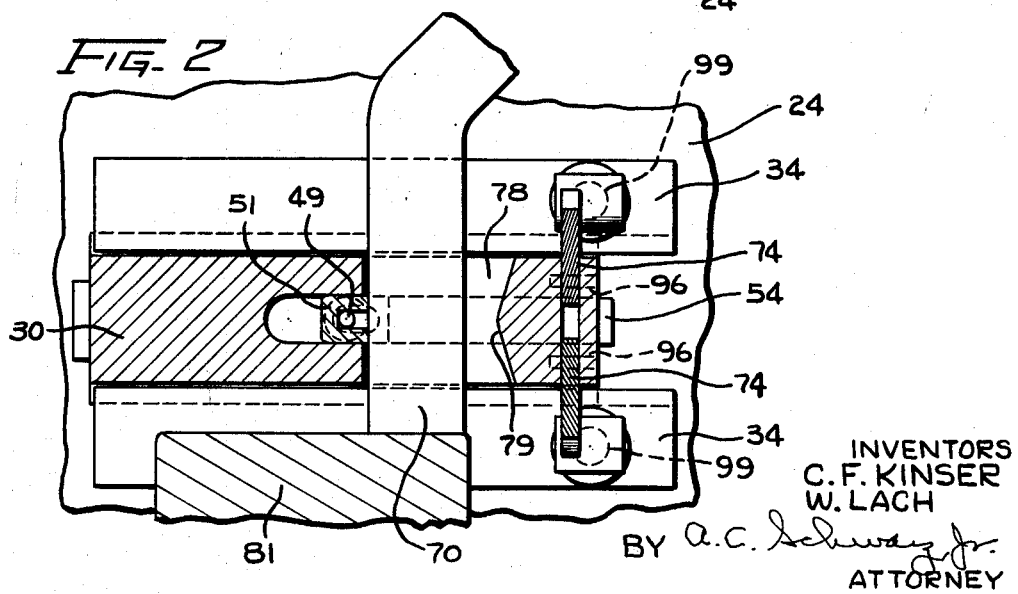
INVENTORS
C. F. KINSER
W. LACH
BY A.C. Schwarz Jr.
ATTORNEY

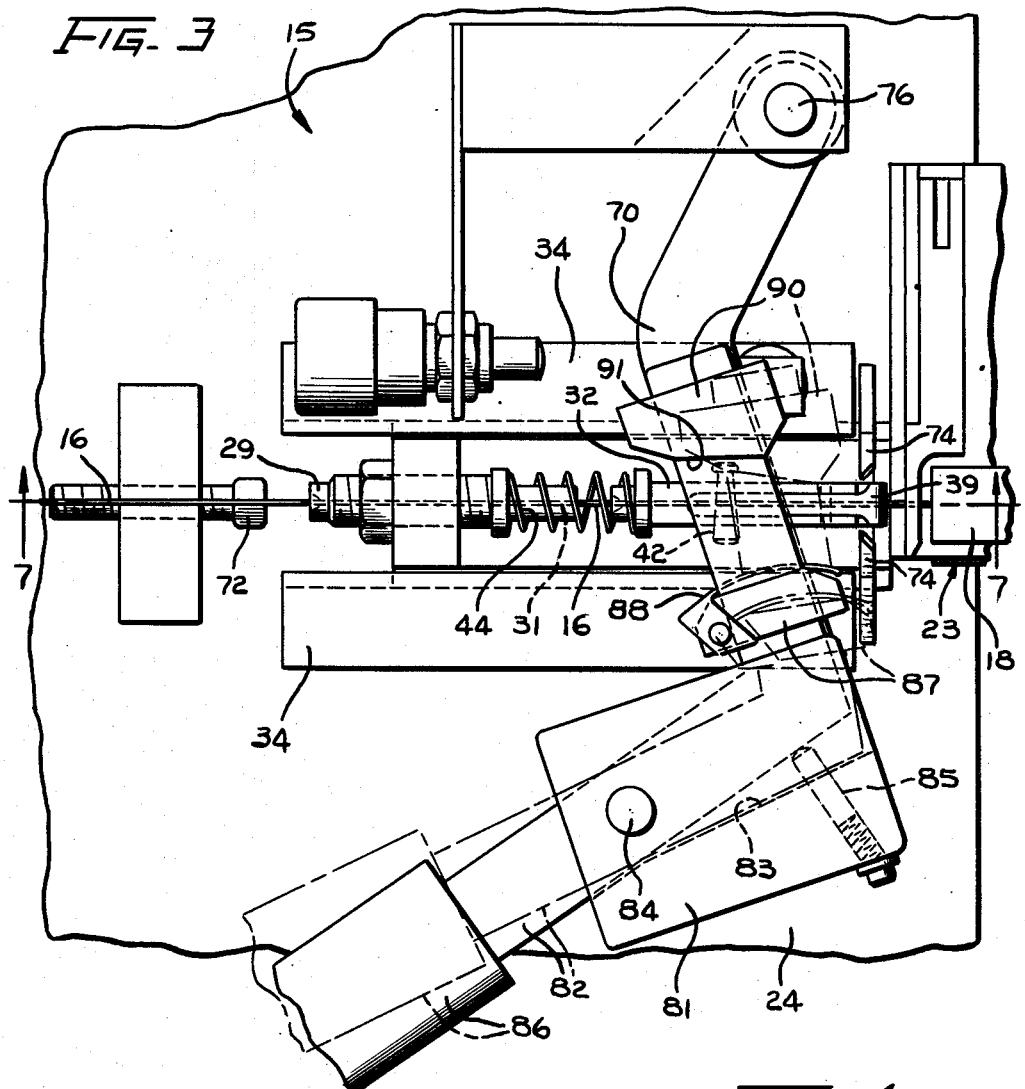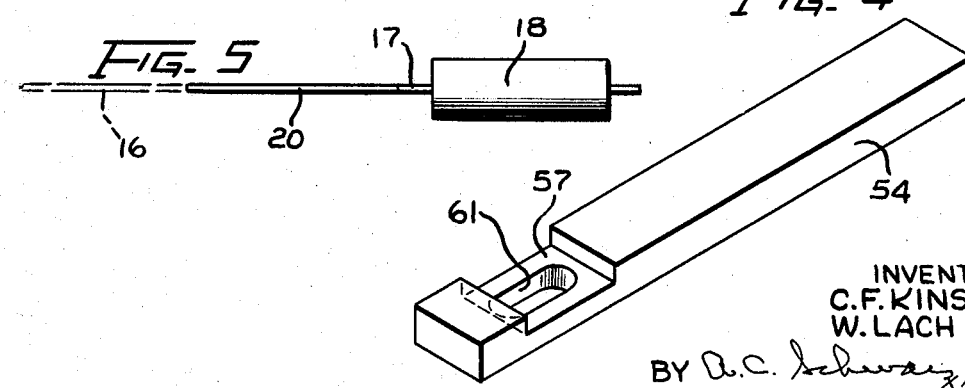

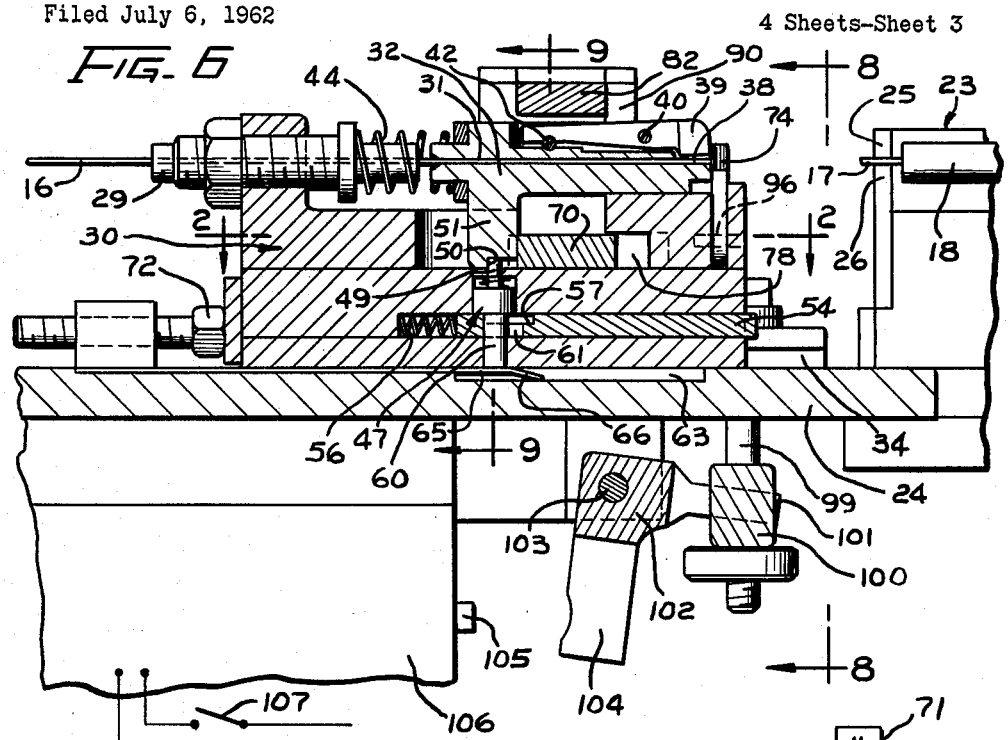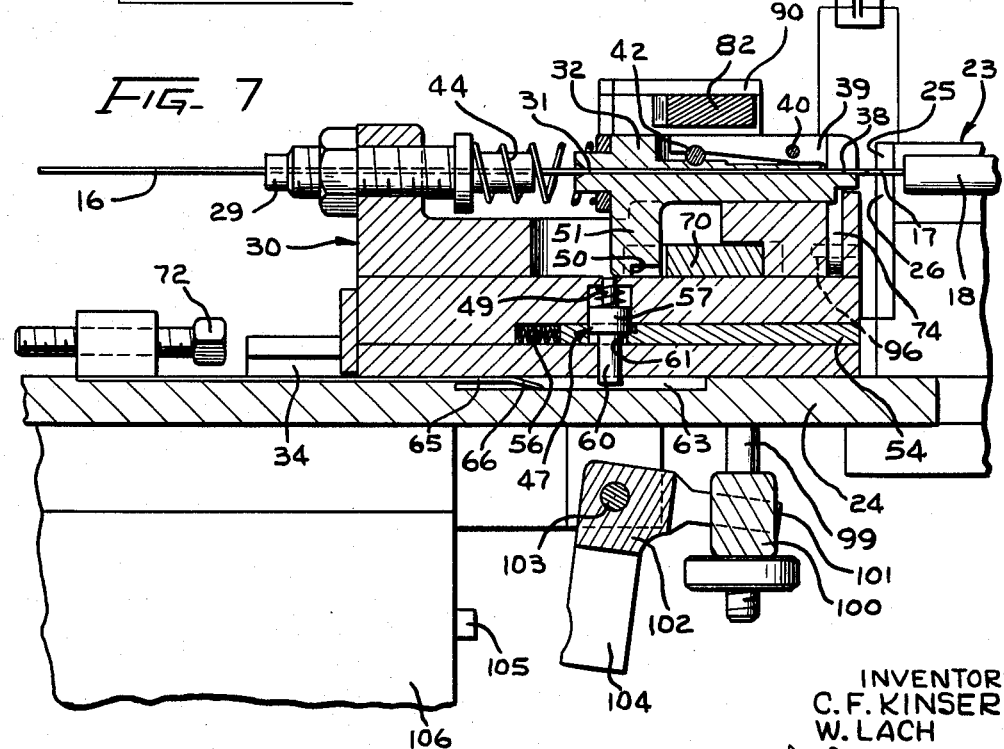

Aug. 25, 1964
C. F. KINSER ETAL
3,146,334
PERCUSSIVE WELDING APPARATUS
Filed July 6, 1962
4 Sheets-Sheet 4
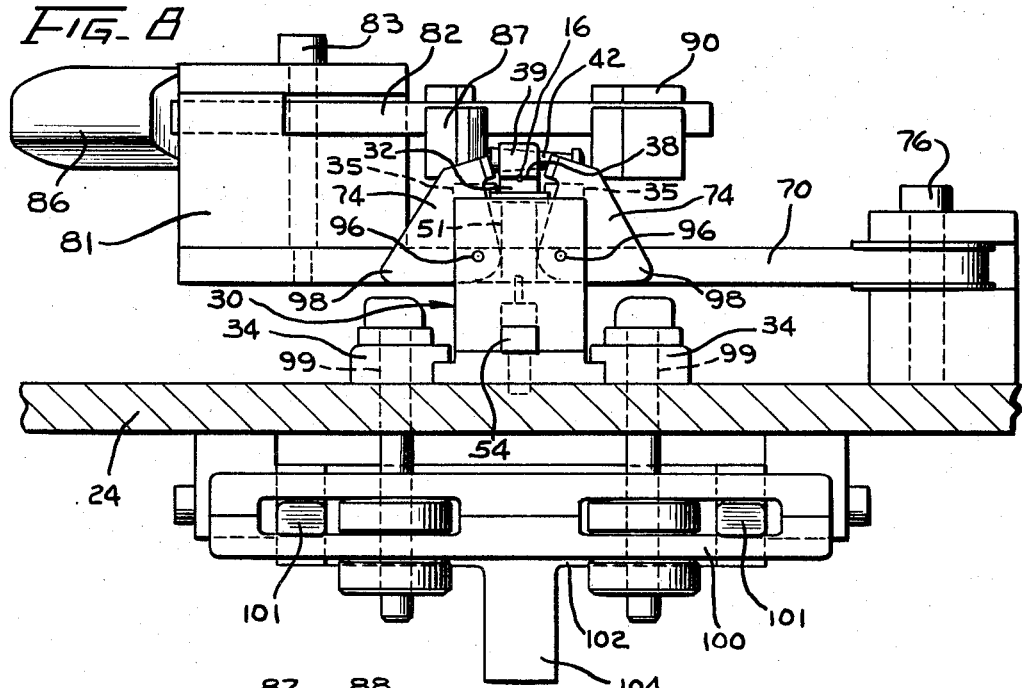
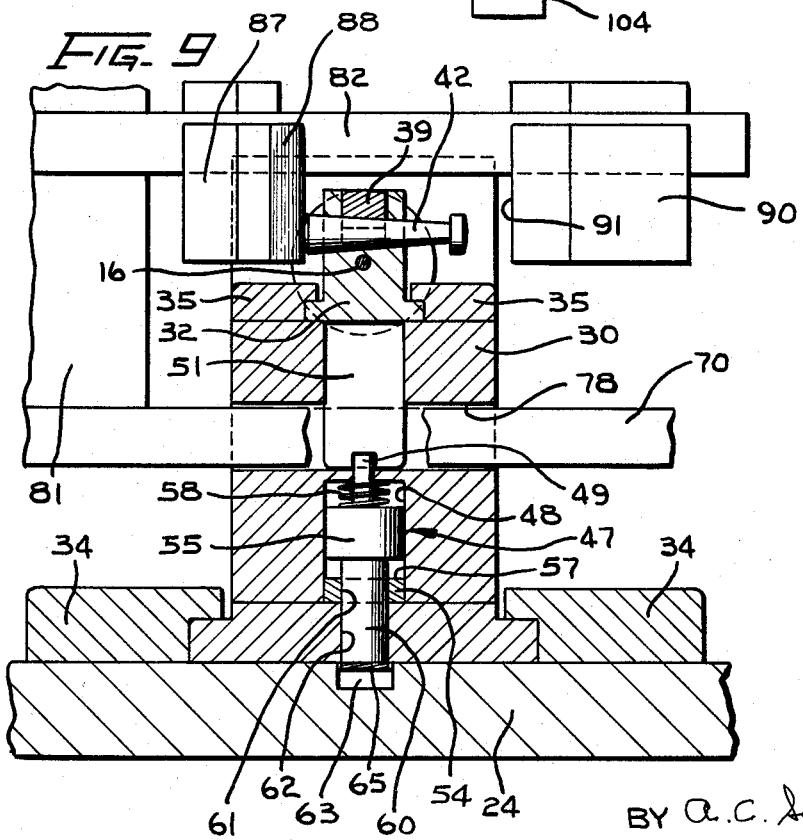
INVENTORS
C. F. KINSER
W. LACH
BY A.C. Schwarz Jr.
ATTORNEY 3,146,334
PERCUSSIVE WELDING APPARATUS
Charles F. Kinser, Downers Grove, and Walter Lach, Chicago, Ill., assignors to Western Electric Company, Incorporated, New York, N.Y., a corporation of New York
Filed July 6, 1962, Ser. No. 208,078
6 Claims. (Cl. 219—95)

This invention relates to a percussive welding apparatus, and more particularly to an apparatus for percussively welding a wire to an electrical component and severing a portion thereof to form a lead for the component.

An object of the invention is to provide an improved percussive welding apparatus.

Another object of the invention is to provide an apparatus for percussively welding a wire to a component and severing a portion of the end of the wire to form a lead for the component.

An apparatus illustrating certain aspects of the invention may include a carrier mounted for movement along a predetermined path toward a holder and an electrical component supported therein, the carrier having an electrode mounted thereon for movement therewith along said path and for limited movement relative thereto. The electrode which releasably grips a wire is spring urged for movement relative to the carrier toward the holder and is held in a normal retracted or cocked position by a latch. A lever in response to movement thereof in one direction engages the carrier and moves it toward the holder to a predetermined advanced position, in response to which the latch is withdrawn to release the electrode and effect the forward movement thereof and the percussive welding of the end of the wire to the electrical component in the holder. The lever, in response to movement in the reverse direction, engages the electrode and effects the return movement of the carrier to its retracted position and the subsequent movement of the electrode to its retracted position on the carrier, in which position it is releasably retained by the latch. Wire shearing members pivotally mounted on the carrier are actuated after the carrier has been moved to its retracted position to sever the wire at a predetermined distance from the component to form a lead on the component.

Other objects, advantages and novel aspects of the invention will become apparent upon consideration of the following detailed description, in conjunction with the accompanying drawings, in which:

FIG. 1 is a fragmentary plan view of the welding apparatus with the carrier and the electrode in retracted positions;

FIG. 2 is a fragmentary plan sectional view of the apparatus taken on line 2—2 of FIG. 6 and with elements of the apparatus in the same position as shown in FIG. 1;

FIG. 3 is a fragmentary plan view of the apparatus showing the carrier in its advanced position and the electrode in its welding position;

FIG. 4 is a perspective view of the latch tripping and supporting member;

FIG. 5 is a perspective view of an electrical component with a lead welded thereto;

FIG. 6 is a vertical longitudinal sectional view through the apparatus taken along the line 6—6 of FIG. 1;

FIG. 7 is a vertical longitudinal sectional view of the apparatus taken along the line 7—7 of FIG. 3;

FIG. 8 is a vertical cross-sectional view through the apparatus taken along the line 8—8 of FIG. 6; and FIG. 9 is an enlarged fragmentary vertical sectional view taken along the line 9—9 of FIG. 6.

Referring to the drawings, the apparatus 15 is designed to percussively welded the end of a wire 16 (FIG. 5) to a stub lead 17 of a capacitor or other electrical component 18 and to sever a predetermined length of the wire to form an extension lead 20 for the capacitor. During the lead welding operation, the capacitor 18 is supported in a holder 23 (FIG. 3) of the apparatus which is mounted on a horizontal frame plate 24 and has two pairs of jaws 25 and 26 (FIGS. 6 and 7) provided with recessed seats for gripping the stub leads 17 and supporting them in a predetermined position at the welding station of the apparatus.

The wire 16 from a supply roll thereof is guided along a horizontal axis in coaxial alignment with the stub lead 17 through a guide sleeve 29 on a carrier 30 (FIGS. 1, 6 and 7) and through a bore 31 of an electrode 32. The carrier 30 is mounted on the frame plate 24 between guide members 34 (FIGS. 8 and 9) for reciprocatory movement parallel to the wire 16 toward and from the holder 23. The electrode 32 is mounted on the carrier 30 for reciprocatory movement therewith and for limited movement relative thereto between guides 35 in a direction parallel to the wire 16.

At its forward end, the electrode 32 has a fixed jaw 38 against which the forward end of the wire 16 is clamped by a movable jaw 39 which is mounted on the electrode for reciprocatory movement therewith and for pivotal movement relative thereto about a pivot pin 40. The rearwardly extending end portion of the movable jaw 39 is adapted to be urged upwardly by a headed tapered pin 42 which engages conical seats in the electrode 32 and the upper jaw 39 and is adapted to be moved to the right, as viewed in FIG. 9, to effect the locking of the movable jaw 39 in closed position to grip the wire 16 against the fixed jaw 38, and to be moved to the left to release the movable jaw 39 and the wire 16.

A helical compression spring 44 interposed between the guide sleeve 29 and the end of the electrode 32 urges the electrode for movement relative to the carrier 30 toward the holder 23 from a normal cocked or retracted position on the carrier (FIG. 6). The electrode 32 is releasably held in its retracted position by a latch 47 (FIGS. 6, 7 and 9) mounted for vertical movement in an aperture 48 in the carrier 30 and having an upwardly extending portion 49 thereof engageable with a shoulder 50 formed on a downwardly extending portion 51 of the electrode 32. The latch 47 is held in its upper position by a latch releasing bar 54 (FIG. 4) on the upper surface of which the enlarged body portion 55 of the latch rests as indicated in FIG. 6.

The latch releasing bar 54 is slidably mounted in a slideway in the carrier 30 and is urged by a spring 56 to the right as viewed in FIGS. 6 and 7. On its upper surface the bar 54 is provided with a notch 57 into which the body portion 55 of the latch drops when the bar 54 is shifted relatively to the carrier to the position shown in FIG. 7 by virtue of the urging of a spring 58. A reduced portion 60 of the latch 47 extends downwardly therefrom through a slot 61 in the bar 54, through a counterbored portion 62 of the aperture 48 in the carrier 30 and into a clearance groove 63 in the frame plate 24. A flat spring 65 is mounted on the frame plate 24 and has a sloping end portion 66 for camming the latch 47 upwardly to its upper position in response to movement of the carrier to its retracted position as shown in FIG. 6.

Mechanism including a lever 70 is provided for moving the carrier 30 in one direction from the retracted position (FIG. 6) to a forward position (FIG. 7) with the carrier 30 and the electrode 32 in a predetermined position relative to the holder 23 and the stub lead 17 therein and to effect the release of the electrode 32 and the percussive welding of the end of the wire 16 to the stub lead 17. It will be understood that the jaws 25 and 26 and the stub lead 17 are connected to one polarity of a welding circuit including a charged capacitor and that the electrode 32 and the wire 16 is connected to the other polarity thereof as indicated diagrammatically at 71 in FIG. 7. In response to movement of the lever 70 in the reverse direction, the carrier 30 is returned to its retracted position in engagement with a stop 72 and the electrode 32 is then moved relative to the carrier to its cocked position thereon in which it is locked under tension by the latch 47. During the return movement of the electrode 32 to the cocked position, the spring 44 is compressed. In its retracted position the carrier 30 is located a predetermined distance from the holder 23 to permit the shearing of the wire 16 at a predetermined distance from the holder 23 by a pair of cutting blades 74 mounted on the carrier 30 to form the extension lead 20 of a predetermined length.

The carrier actuating lever 70 is pivotally supported on a fixed pivot 76 on the frame plate 24 and has a portion thereof extending horizontally through a transverse slot 78 in the carrier 30 (FIGS. 2, 6, 7 and 9). One side of the lever 70 in response to movement thereof in one direction is engageable with a surface 79 of the carrier (FIG. 2) and the opposite side of the lever is engageable with the depending portion 51 of the electrode 32 (FIG. 6) in response to movement of the lever 70 in the opposite direction. It will be understood that the carrier 30 is provided with a clearance recess permitting limited movement of the depending portion 51 of the electrode 32.

The free end of the lever 70 has an enlarged block 81 thereon which extends upwardly therefrom and supports a second lever 82 in a slot 83 therein for limited horizontal pivotal movement above the electrode 32 and about a pivot pin 84. A spring pressed pin 85 in the block 81 urges the lever 82 in a counterclockwise direction to the full line position shown in FIG. 1, and the lever 82 has a handle 86 by means of which the levers 70 and 82 may be manipulated by an operator.

Mounted on the lever 82 is an actuating member 87 which extends downwardly therefrom on one side of the electrode 32 and carries a leaf spring 88 which is capable of being moved to engage the left-hand end of the tapered pin 42, as viewed in FIG. 9, to move the tapered pin to the right and effect the actuation of the jaw 39 into closed position to grip the wire 16 against the fixed jaw 38 of the electrode. A second actuating member 90 is also mounted on the lever 82 on the other side of the electrode 32 and has a surface 91 capable of engaging the right-hand headed end of the tapered pin 42 and moving the pin to the left to release the jaw 39 and the wire 16 in response to predetermined manipulation of the lever 82.

As shown in FIGS. 1, 6 and 8, the wire cutting blades 74 are supported on the carrier 30 on opposite sides of the electrode 32 for movement with the carrier toward and away from the holder 23 and for pivotal movement relative to the carrier about pivot pins 96. In their normal open position, as shown in FIG. 8, the cutting edges of the blades are disposed on opposite sides of the electrode for movement of the electrode therebetween. Laterally extending portions 98 of the cutting blades are disposed above pusher rods 99 which are supported for vertical movement in suitable guide apertures in the frame plate 24 and are secured to a cross bar 100.

The cross bar 100 is supported on the ends of a pair of rocker arms 101 which are interconnected by a bar 102 (FIG. 6) that is mounted for rocking movement about a fixed pivot 103 on the frame plate 24. An arm 104 depends from the bar 102 in the path of a plunger 105 of a solenoid 106 that is supported on the underneath side of the frame plate 24. In response to energization of the solenoid 106 under control of a manually operable switch 107 (FIG. 6), the plunger 105 is advanced to engage and move the arm 104 and effect the actuation of the cutting blades 74 to shear the wire 16 adjacent to the end portion of the electrode 32 in the normal retracted position of the electrode 32 and the carrier 30 as shown in FIG. 6.

*Operation*

In the operation of the apparatus, a capacitor 18, to the stub lead 17 of which an extension lead 20 is to be welded, is first mounted in the holder 23 with the leads 17 thereof gripped between the jaws 25 and 26. The operator grasps the handle 86 and swings the lever 70 in a counter-clockwise direction about the pivot 76, as viewed in FIG. 1, while maintaining the lever 82 in the same or full line relationship thereto. During its counterclockwise movement, the lever 70 engages the surface 79 of the carrier 30 (FIG. 2) and advances the carrier from its retracted position (FIG. 6) to an advanced position (FIG. 7) in engagement with the holder 23. During the final portion of the movement of the carrier, the latch releasing bar 54 engages the holder 23 and is shifted thereby, against the urging of the spring 56, to permit the downward movement of the latch 47 into the notch 57 of the bar 54 by action of the spring 58. This releases the electrode 32 and permits it to be rapidly advanced by the spring 44 toward the holder 23 and effect the percussive welding of the end of the wire 16 to the stub lead 17.

After moving the carrier 30 to its forward position, the levers 70 and 82 are in the position shown in full line in FIG. 3 with the surface 91 of the pin actuating element 90 in close proximity to the headed end of the tapered pin 42. The operator then swings the lever 82 in the slot 83 in a clockwise direction about the pivot 84 to its dotted line position indicated in FIG. 3, to cause the actuating member 90 to engage the tapered pin and move it to the left as viewed in FIG. 9, to effect the release of the upper jaw 39 and the wire 16 from the electrode 32. Thereafter, the operator, holding the handle 86 in its dotted line position as shown in FIG. 3, swings the levers 82 and 70 to the left about the pivot 76 to return the carrier to its normal retracted position shown in FIG. 1.

During its return movement, the lever 70 engages the depending portion 51 of the electrode 32 and moves the electrode to the left, as viewed in FIG. 7, thereby effecting the return of the carrier 30 through the medium of the spring 44 to its retracted position in engagement with the stop 72 while the wire 16 is held stationary. Thereafter, further movement of the lever effects the compression of the spring 44, and the movement of the electrode 32 relative to the carrier 30 to its cocked position on the carrier, in which position the electrode is locked by the latch 47 as the latch is moved upwardly by the flat leaf spring 65. Next, the lever 82 is rocked in a counterclockwise direction in the slot 83 about the pivot pin 84 to cause the leaf spring 88 on the actuating member 87 of the lever to engage the other end of the tapered pin 42 and move the pin to the right, as viewed in FIG. 9, to impart a rocking movement of the jaw 39 into closed position to grip the wire 16 against the jaw 38.

The operator may then close the switch 107 to effect the energization of the solenoid 106 and its plunger 105 and the actuation of the cutting blades 74 to shear the wire 16 adjacent to the forward end of the electrode 32, thereby severing the lead forming portion 20 from the wire 16. The capacitor 18 with the extension lead 20 welded thereto is then removed from the holder 23 and the apparatus is in condition for the next cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a percussive welding apparatus:
    an electrode for releasably gripping a wire;
    a carrier for supporting said electrode for limited movement thereon along a path parallel to the wire;
    resilient means for urging said electrode for movement from a normal cocked position on said carrier toward an article supported in its path;
    mounting means for supporting said carrier for movement along said path from a retracted position to an advanced position adjacent to the article;
    means including a reciprocatory element operable in response to movement in one direction for effecting the movement of said carrier to the advanced position and operable in response to movement in the reverse direction for effecting the movement of said carrier to the retracted position and the movement of the electrode to the cocked position on said carrier; and
    means operable in response to the movement of said electrode to said cocked position for latching said electrode in such position and operable in response to movement of said electrode to the advanced position for releasing said electrode to effect the percussive welding of the wire to the article.

2. The structure as defined in claim 1 including wire severing means mounted on said carrier for movement therewith and operable when said carrier is in the retracted position to sever the wire at a predetermined distance from the article.

3. In a percussive welding apparatus:
    a welding electrode for releasably gripping a straight wire;
    a carrier for supporting the electrode for movement thereon along a path parallel to the wire;
    resilient means for stressing said electrode for movement from a normal cocked position on said carrier toward an article supported in its path;
    means operative in responsive to movement of said electrode to the cocked position for latching it in such position;
    mounting means for supporting said carrier for movement along said path from a retracted position to an advanced position adjacent to the article;
    a lever pivotally mounted on said mounting means for reciprocating said carrier, said lever being operative in response to movement in one direction to engage said carrier and effect the movement thereof and the electrode thereon to the advanced position and being operative in response to movement in the reverse direction for engaging the electrode and effecting the movement of said carrier to the retracted position and the movement of said electrode to the cocked position; and
    means operable in response to the movement of said carrier to the advanced position for actuating said latching means to effect the release of said electrode.

4. The structure as defined in claim 3 including wire severing means mounted on said carrier for movement therewith to retracted and forward positions; and
    means on said mounting means for actuating said wire severing means when said carrier is in the retracted position to effect the severance of the wire at a predetermined distance from the article.

5. In an apparatus of the type described:
    mounting means;
    a carrier supported on said mounting means for reciprocatory movement along a predetermined path to a forward position at a welding station and to a retracted position;
    an electrode mounted on said carrier for movement therewith and for limited movement relative thereto along said path, said electrode having a fixed jaw for supporting a wire parallel to the path of movement;
    a second jaw pivotally mounted on said electrode for movement from an open position to a closed position for gripping the wire against said fixed jaw;
    a member mounted on said electrode for movement therewith and for movement relative thereto to and from first and second positions for actuating said jaw to open and closed positions;
    resilient means for urging said electrode for movement from a normal cocked position toward the welding station and an article supported thereat;
    means including a reciprocatory element operable in response to movement in one direction for effecting the movement of said carrier to the forward position and operable in response to movement in the reverse direction for effecting the movement of said carrier to the retracted position and the movement of the electrode to the cocked position on said carrier;
    means operative in response to movement of said electrode to the cocked position for latching said electrode in such position;
    means responsive to the movement of said carrier to the forward position for actuating said latching means to effect the release of said electrode; and
    means mounted on said element for movement therewith and for selectively actuating said jaw actuating member to first and second positions.

6. In a percussive welding apparatus:
    mounting means;
    a carrier supported on said mounting means for reciprocatory movement along a predetermined path to a forward position at a welding station and to a retracted position;
    an electrode mounted on said carrier for movement therewith and for limited movement relative thereto along said path, said electrode having surfaces including a fixed jaw for supporting a wire parallel to the path of movement;
    a movable jaw pivotally mounted on said electrode for gripping the wire against said fixed jaw;
    a member mounted on said electrode for movement therewith and for movement relative thereto to and from first and second positions for actuating said jaw to open and closed positions to effect the gripping and release of the wire;
    resilient means for stressing said electrode for movement from a normal cocked position toward an article supported at the welding station;
    a carrier actuating lever pivotally supported on said mounting means and operable in response to movement thereof in one direction to engage said carrier and move it and the electrode to the forward position and operable in response to movement thereof in the opposite direction for engaging said electrode and effecting the movement of said carrier to said retracted position and the compression of said resilient means and the movement of said electrode to the cocked position;
    means for latching said electrode in said cocked position;
    means responsive to the movement of said carrier to said forward position to actuate said latching means to effect the release of said electrode and the forward movement thereof to carry the wire into percussive engagement with the article;

a second lever pivotally mounted on said first lever for movement therewith and for limited movement relative thereto; and means on said second lever for moving said jaw actuating member to the first position in response to movement of said second lever in one direction and for moving said jaw actuating member to the second position in response to movement of said second lever in the opposite direction.

References Cited in the file of this patent

UNITED STATES PATENTS

| | | |
|---|---|---|
| 2,878,362 | Quinlan | Mar. 17, 1959 |
| 2,921,177 | Gellatly et al. | Jan. 12, 1960 |
| 2,984,733 | Born | May 16, 1961 |
| 2,986,625 | Houda et al. | May 30, 1961 |